(12) United States Patent
Bertez

(10) Patent No.: US 6,664,504 B2
(45) Date of Patent: Dec. 16, 2003

(54) METHOD AND PLANT FOR LASER CUTTING WITH DUAL-FLOW AND DOUBLE-FOCUS CUTTING HEAD

(75) Inventor: Christophe Bertez, Vaureal (FR)

(73) Assignee: L'Air Liquide - Societe Anonyme a Directoire et Conseil de Surveillance pour l'Etude et l'Exploitation des Procedes Georges Claude, Paris Cedex (FR)

( * ) Notice: Subject to any disclaimer, the term of this patent is extended or adjusted under 35 U.S.C. 154(b) by 27 days.

(21) Appl. No.: 10/013,533

(22) Filed: Dec. 13, 2001

(65) Prior Publication Data

US 2002/0088784 A1 Jul. 11, 2002

(30) Foreign Application Priority Data

Dec. 13, 2000 (FR) .............................. 00 16219

(51) Int. Cl.$^7$ ............................................. B23K 26/00
(52) U.S. Cl. ............................ 219/121.84; 219/121.78
(58) Field of Search ........................ 219/121.84, 121.78, 219/121.6

(56) References Cited

U.S. PATENT DOCUMENTS 3,989,778 A * 11/1976 Osborne ...................... 264/25
4,467,171 A * 8/1984 Ramos .................. 219/121 LG
5,231,262 A    7/1993 Matsumura et al.
5,521,352 A * 5/1996 Lawson .................. 219/121.67
5,728,993 A * 3/1998 O'Neill .................. 219/121.67

FOREIGN PATENT DOCUMENTS

| DE | 27 13 904 | 10/1978 | |
| DE | 40 34 745 | 7/1991 | |
| EP | 0 757 932 | 2/1997 | |
| EP | 757932 | * 2/1997 | ........... B23K/26/00 |
| EP | 1 020 249 | 7/2000 | |
| JP | 56 122690 | 9/1981 | |
| JP | 01 048692 | 2/1989 | |
| WO | 98/14302 | * 4/1998 | ........... B23K/26/06 |

* cited by examiner

Primary Examiner—M. Alexandra Elve
(74) Attorney, Agent, or Firm—Young & Thompson

(57) ABSTRACT

Method and plant for cutting or welding by a laser beam with dual-flow and double-focus cutting head. The plant includes a laser generator to generate at least one main laser beam (10), a first optical element (1) enabling the main laser beam (10) to be divided into at least two subsidiary laser beams (11, 12), a first outlet nozzle (4) through which one (11) of the subsidiary laser beams passes, and a second outlet nozzle (3) through which the other (12) of the subsidiary laser beams passes, the first and second outlet nozzles (4, 3) being approximately coaxial one with the other. In this way, it is possible to focus the central beam (11) onto a focusing point (PF) by a first focusing element (1), such as a lens, and the other beam (12) onto an annular focusing zone (ZAF).

18 Claims, 1 Drawing Sheet

METHOD AND PLANT FOR LASER CUTTING WITH DUAL-FLOW AND DOUBLE-FOCUS CUTTING HEAD

FIELD OF THE INVENTION

The present invention relates to a method and a plant for cutting by means of a laser beam using a laser device comprising a laser cutting head with a dual flow of assist gas and a double focus for focusing the laser beam.

BACKGROUND OF THE INVENTION

In industry, it is well known to use a laser beam to cut or weld one or more metal workpieces. By way of example, documents DE-A-2713904, DE-A-4034745, JP-A-01048692, JP-A-56122690, WO 97/34730, JP-A-01005692, DE-A-4123716, JP-A-02030389, U.S. Pat. No. 4,871,897, JP-A-230389, JP-A-62104693, JP-A-15692, JP-A-15693, JP-A-15694, JP-A-220681, JP-A-220682, JP-A-220683, WO-A-88/01553, DE-A-3619513 and DE-A-3934920 may be mentioned.

An alternative to the existing methods is proposed by document WO-A-98/14302 which teaches a method for cutting a metal workpiece using a transparent or reflecting optical means, that is to say a mirror or lens, in order to focus a laser beam onto several focusing points distinct one from the other and located on the same axis and having different convergence angles.

Moreover, it is known that cutting structural steels using oxygen or a gas mixture containing oxygen as an assist gas generates oxides on the cut faces, which prevents the cohesion of paint on workpieces cut in this way.

To try and solve this problem, there are currently two solutions.

The first solution consists in brushing the workpieces after each cutting, which is long and tedious.

The second solution is to cut the pieces under nitrogen at high pressure, typically of the order of 10 to 20 bar, which involves a high cost because of the considerable nitrogen consumption, the low cutting speeds and a limit on the thicknesses that can be cut.

Furthermore, in the case of stainless steels or coated aluminium, the usual presence of a plastic film on the surface, intended to protect them, often generates flash or prevents the correct execution of the cutting operation.

What is then involved is choosing a plastic coating suitable for laser cutting, but these are still rare at present and expensive, or to carry out a first vaporization pass, that is to say burning the surface of the plastic layer by a laser, before the actual cutting of the material, which complicates the procedure and is detrimental to productivity.

SUMMARY OF THE INVENTION

The aim of the present invention is thus to solve the aforementioned problems by providing an improved method of cutting or welding by means of a laser beam, that is to say a method which in particular allows structural steels to be cut while minimizing or removing the layer of oxides which is formed when the steels are cut under oxidizing gas and which allows stainless steels coated with a plastic film to be cut while avoiding carrying out a first vaporization pass before the actual cutting.

The invention therefore relates to a plant for cutting or welding by laser beam comprising:

at least one laser generator to generate at least one main laser beam,
a first optical means enabling the said main laser beam to be divided into at least two subsidiary laser beams,
at least one first outlet nozzle through which at least one of the said subsidiary laser beams passes,
at least a second outlet nozzle through which at least the other of the said subsidiary laser beams passes,
the said first and second outlet nozzles being approximately coaxial one with the other.

Depending on the case, the plant of the invention may comprise one or more of the following characteristics:
the central beam passes through the first outlet nozzle and the peripheral beam passes through the second outlet nozzle,
the first optical means and the second optical means are arranged coaxially one with respect to the other,
the said first optical means enables the main laser beam to be divided into a central beam and a peripheral beam of annular or cylindrical shape and the said central beam to be focused onto a focusing point, and moreover a second optical means enables the peripheral beam to be focused onto an annular focusing zone distinct from the focusing point,
the plant comprises a first source of assist gas feeding the first outlet nozzle and/or a second source of assist gas feeding the second outlet nozzle,
the first optical means and/or the second optical means are transparent or reflecting, preferably the first optical means and/or the second optical means are lenses.

The invention also relates to a method of cutting or welding at least one metal workpiece, in which:
(a) at least one main laser beam is generated,
(b) the said main laser beam is divided into at least two subsidiary laser beams,
(c) the said beam is focused onto a focusing point by means of a first focusing means,
(d) the said subsidiary beam is focused onto an annular focusing zone,
(e) the cutting or welding takes place by melting at least part of at least one workpiece by means of the said subsidiary beams.

According to another aspect, the invention also relates to a process for cutting or welding at least one metal workpiece, in which:
(a) at least one main laser beam is generated,
(b) the said main laser beam is divided into at least two subsidiary laser beams,
(c) one of the said subsidiary laser beams is guided through a first outlet nozzle and the said beam is focused onto a focusing point (PF) by means of a first focusing means,
(d) the other of the said subsidiary laser beams is guided through a second outlet nozzle arranged approximately coaxially with the first outlet nozzle and the said subsidiary beam is focused onto an annular focusing zone (ZAF) and,
e) the cutting or welding takes place by melting at least part of at least one workpiece by means of the said subsidiary beams.

Depending on the case, the method of the invention may comprise one or more of the following characteristics:
it comprises at least one of the additional steps of:
(f) feeding the first outlet nozzle and/or the second outlet nozzle with one or more gases or gas mixtures;
(g) carrying out a relative displacement movement of the workpiece or workpieces to be cut or welded with respect to the first outlet nozzle and/or the second outlet nozzle;

the subsidiary beam is focused onto the said annular focusing zone by means of a second focusing means.

In step (b), the main laser beam is divided by means of the first optical means into a central beam focusing onto the said focusing point and into a peripheral annular or cylindrical beam, guided or conveyed towards the second focusing means enabling the peripheral beam to be focused onto the annular focusing zone.

The central beam and the peripheral beam are guided or focused coaxially one with the other.

The central beam is focused onto a focusing point located near to the lower surface of the workpiece to be cut and the said focusing zone is focused close to the upper surface of the workpiece, in the thickness of the material or outside the latter, preferably the cutting gas used is a non-oxidizing gas.

The central beam is focused onto a focusing point located close to the upper surface of the workpiece to be cut and the said focusing zone is focused close to the upper surface of the workpiece, in the thickness of the material or outside the latter, preferably the cutting gas used is an oxidizing gas.

The first outlet nozzle is fed with an oxidizing gas and the second outlet nozzle is fed with a non-oxidizing gas, and a workpiece made of steel, aluminium or their alloys is cut.

The first outlet nozzle is fed with a non-oxidizing gas and the second outlet nozzle is fed with a non-oxidizing gas, and a workpiece made of steel coated with at least one polymer layer, preferably a stainless steel, is cut.

The non-oxidizing gas is nitrogen or a gas mixture containing mostly nitrogen and the oxidizing gas is oxygen or a gas mixture containing oxygen.

The relative position of at least one of two focusing means is adjusted or altered with respect to the other, in order to vary the focusing position or location of the focusing point and/or of the focusing zone in the thickness of the material to be cut.

BRIEF DESCRIPTION OF THE DRAWINGS

The invention is illustrated in the appended FIGURE which shows the cutting head of a plant for cutting by means of a laser beam according to the invention.

DETAILED DESCRIPTION OF THE INVENTION

Figure 1:
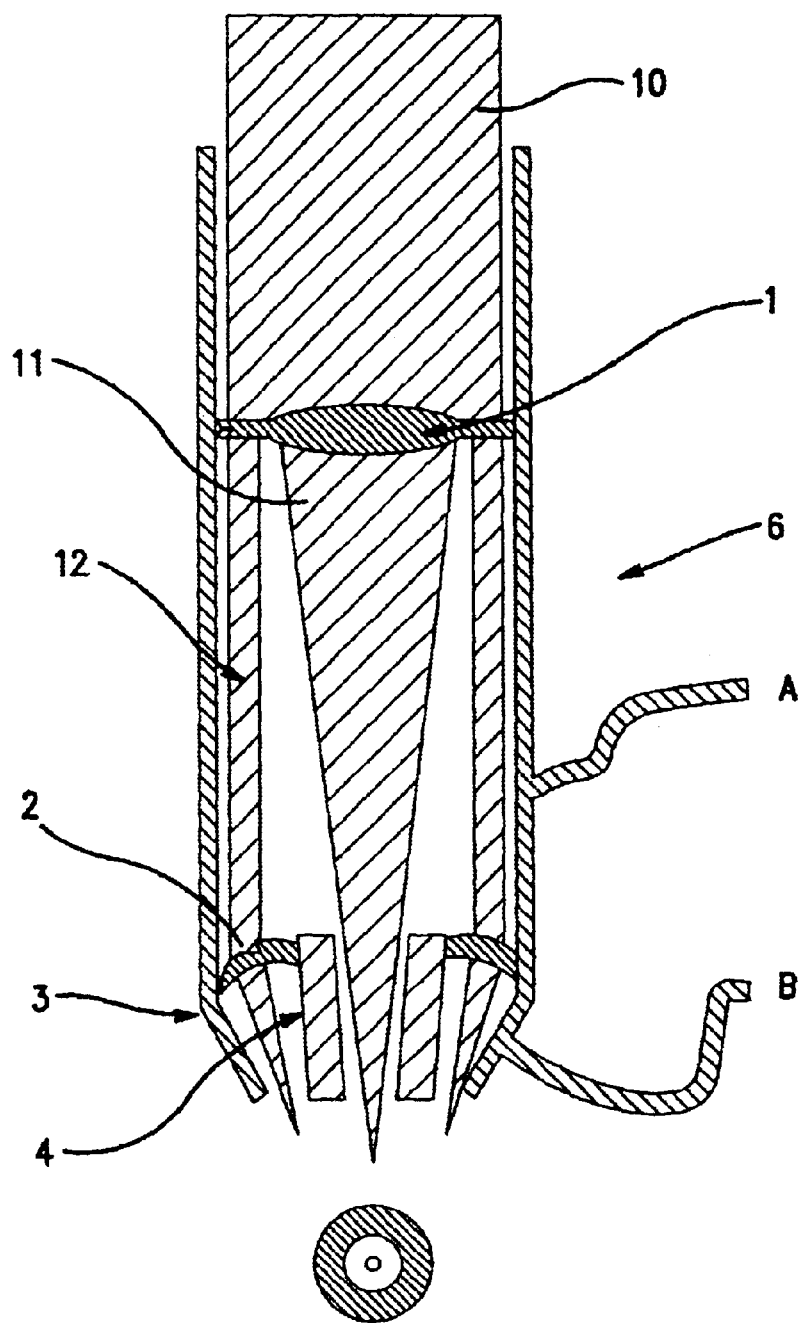

More specifically, it can be seen that the main laser beam 10, generated by a laser generator (not shown) of the $CO_2$ or Nd:YAG type, is divided or split up into two subsidiary laser beams 11, 12 on passing through a first optical means 1, such as a lens.

The first optical means 1 is arranged in the cutting head 6 making it possible to divide the beam 10 into two parts or sub-beams, namely a central beam 11, located in a central position, and an annular, that is to say cylindrical, peripheral beam 12, situated at the periphery, the two sub-beams being approximately coaxial.

The first optical means 1 is preferably a lens comprising a central portion having a non-zero radius of curvature over part of its diameter to enable the central beam 11 to be focused and a peripheral portion forming a ring around the said central portion and having a zero radius of curvature in order to obtain an unfocused beam 12 which is directed towards a second optical means 2.

The central beam 11 passes through a first outlet nozzle 4 or cutting nozzle and the peripheral beam 12 passes through a second outlet nozzle 3 or flushing nozzle, after it is focused by the second optical means 2.

The first nozzle 4 is located inside the head 6, while the second nozzle 3 is arranged outside the head 6 and coaxially with the first nozzle 4.

The second optical means 2, which enables the peripheral or annular beam 12 to be focused after it has passed through the first optical means 1, is in this case formed by a lens recessed at its centre so that the position of the cutting nozzle 4 can be fixed and maintained there.

The central beam 11 passes through the first nozzle 4 and the peripheral beam 12 passes through the second outlet nozzle 3.

The first optical means 1 enables the central beam 11 to be focused at a focusing point PF, while the second optical means 2 enables the cylindrical peripheral beam 12 to be focused onto an annular focusing zone ZAF, that is to say onto an annular ring, the said annular focusing zone ZAF being distinct from the focusing point PF.

The focusing point PF obtained is situated close to the lower or upper surface of the workpiece to be cut, depending on the type of cutting gas employed. For example, if the gas is oxygen, then the focusing point is preferably focused on the upper part of the workpiece, while if the gas is nitrogen, then the focusing point is preferably focused on the lower part of the workpiece.

Moreover, the annular focusing zone ZAF itself is located close to the upper surface of the workpiece, in the thickness of the material or outside the latter.

In other words, the annular focusing zone ZAF is located, depending on the case, in a plane above that passing through the focusing point PF and parallel to the plane of the surface of the workpiece to be cut, in the case of a plate with parallel faces, for example, in a plane below that passing through the focusing point PF or in the same plane as that of the focusing point PF; in the latter case, the focusing point PF will be encircled by the annular focusing zone ZAF.

In order to assist the action of the laser beams, the first nozzle 4 is fed with a cutting gas and the second nozzle 4, with a flushing gas from sources A and B, respectively.

In the case of a workpiece made of structural steel, the cutting gas from the source A is, for example, oxygen, while the flushing gas from the source B is, for example, nitrogen. This method of proceeding makes it possible to eliminate or minimize the formation of the layer of oxides which usually forms, during cutting, on the cutting faces.

Conversely, in the case of a workpiece made of stainless steel coated with a plastic film, the cutting gas from the source A and the flushing gas from the source B are, for example, nitrogen. In this case, the productivity of the method is not penalized by using the method of the invention.

In addition, the presence of the annular focusing zone ZAF on the surface or close to the surface of the workpiece makes it possible to remove, in real time, the plastic film without needing to carry out a pass in advance.

In other words, according to the invention, it is chosen to focus the peripheral beam 12 on the upper surface of the workpiece to be cut or welded or slightly above the said upper surface, when it is desired to scour the said surface or to vaporize a coating element present on the latter, for example, a polymer film, or a layer of zinc, respectively.

Conversely, it is chosen to focus the peripheral beam 12 on the lower surface of the workpiece to be cut or in the thickness of the said workpiece, when it is desired to obtain a cut free from oxides on the edges of the cutting kerf.

The method of the invention can be used to cut or weld plates, metal sheets and tubes, especially workpieces having a thickness between 1 mm and 20 mm, or even more depending on the material to be machined and/or the power of the laser used.

What is claimed is:

1. Apparatus for cutting or welding by laser beam comprising:
   at least one laser generator to generate at least one main laser beam;
   a first optical means enabling said main laser beam to be divided into at least two subsidiary laser beams;
   at least one first outlet nozzle through which at least one of said subsidiary laser beams passes;
   at least a second outlet nozzle through which at least the other of said subsidiary laser beams passes;
   said first and second outlet nozzles being approximately coaxial one with the other.

2. The apparatus according to claim 1, wherein said first optical means enables the main laser beam to be divided into a central beam and a peripheral beam of annular or cylindrical shape and the central beam to be focused onto a focusing point; said apparatus further comprising a second optical means enabling the peripheral beam to be focused onto an annular focusing zone distinct from the focusing point.

3. Method of cutting or welding at least one metal workpiece, which comprises:
   (a) generating at least one main laser beam;
   (b) dividing said main laser beam into at least a first subsidiary laser beam and a second subsidiary laser beam;
   (c) focusing the first subsidiary laser beam onto a focusing point with a first focusing element;
   (d) focusing the second subsidiary laser beam onto an annular focusing zone distinct from the focusing point;
   wherein the cutting or welding takes place by melting at least part of at least one workpiece with the subsidiary laser beams.

4. The method according to claim 3, wherein the second subsidiary laser beam is focused onto the annular focusing zone with a second focusing element.

5. The method according to claim 4, wherein in step (b), the main laser beam is divided by the first optical element into a central beam focusing onto said focusing point, and into a peripheral annular or cylindrical beam, guided or conveyed towards the second focusing element enabling the peripheral beam to be focused onto the annular focusing zone.

6. The method according to claim 3, wherein the central beam and the peripheral beam are guided or focused coaxially one with the other.

7. The method according to claim 3, wherein the workpiece has an upper surface and a lower surface, and the central beam is focused onto a focusing point located near to the lower surface of the workpiece, and the annular focusing zone is focused close to the upper surface of the workpiece, in the thickness of the material or outside the latter, using a non-oxidizing cutting gas.

8. The method according to claim 3, wherein the workpiece has an upper surface and a lower surface, and the central beam is focused onto a focusing point located close to the upper surface to be cut, and the focusing zone is focused close to the upper surface of the workpiece, in the thickness of the material or outside the latter, using an oxidizing cutting gas.

9. Method of cutting or welding at least one metal workpiece, which comprises:
   (a) generating at least one main laser beam;
   (b) dividing said main laser beam into at least a first subsidiary laser beam and a second subsidiary laser beam;
   (c) guiding the first subsidiary laser beam through a first outlet nozzle, and focusing said first subsidiary laser beam onto a focusing point with a first focusing element;
   (d) guiding the second subsidiary laser beam through a second outlet nozzle arranged approximately coaxially with the first outlet nozzle, and focusing said second subsidiary laser beam onto an annular focusing zone;
   wherein the cutting or welding takes place by melting at least part of at least one workpiece with the subsidiary laser beams.

10. The method according to claim 9, wherein the first outlet nozzle is fed with an oxidizing gas, and the second outlet nozzle is fed with a non-oxidizing gas, and the workpiece is made of steel, aluminum or alloys thereof.

11. The method according to claim 9, wherein the first outlet nozzle is fed with a non-oxidizing gas, and the second outlet nozzle is fed with a non-oxidizing gas, and the workpiece is made of steel coated with at least one polymer layer.

12. The method according to claim 10, wherein the non-oxidizing gas is nitrogen or a gas mixture containing mostly nitrogen, and the oxidizing gas is oxygen or a gas mixture containing oxygen.

13. The method according to claim 11, wherein the non-oxidizing gas is nitrogen or a gas mixture containing mostly nitrogen, and the oxidizing gas is oxygen or a gas mixture containing oxygen.

14. The method according to claim 9, wherein the second subsidiary laser beam is focused onto the annular focusing zone with a second focusing element.

15. The method according to claim 9, wherein in step (b), the main laser beam is divided by the first optical element into a central beam focusing onto said focusing point, and into a peripheral annular or cylindrical beam, guided or conveyed towards the second focusing element enabling the peripheral beam to be focused onto the annular focusing zone.

16. The method according to claim 9, wherein the central beam and the peripheral beam are guided or focused coaxially one with the other.

17. The method according to claim 9, wherein the workpiece has an upper surface and a lower surface, and the central beam is focused onto a focusing point located near to the lower surface of the workpiece, and the annular focusing zone is focused close to the upper surface of the workpiece, in the thickness of the material or outside the latter, using a non-oxidizing cutting gas.

18. The method according to claim 9, wherein the workpiece has an upper surface and a lower surface, and the central beam is focused onto a focusing point located close to the upper surface to be cut, and the focusing zone is focused close to the upper surface of the workpiece, in the thickness of the material or outside the latter, using an oxidizing cutting gas.

* * * * *